Sept. 8, 1970             D. C. WINGER             3,527,031
METHOD AND APPARATUS FOR HARVESTING FIELD CROPS
Filed March 3, 1967
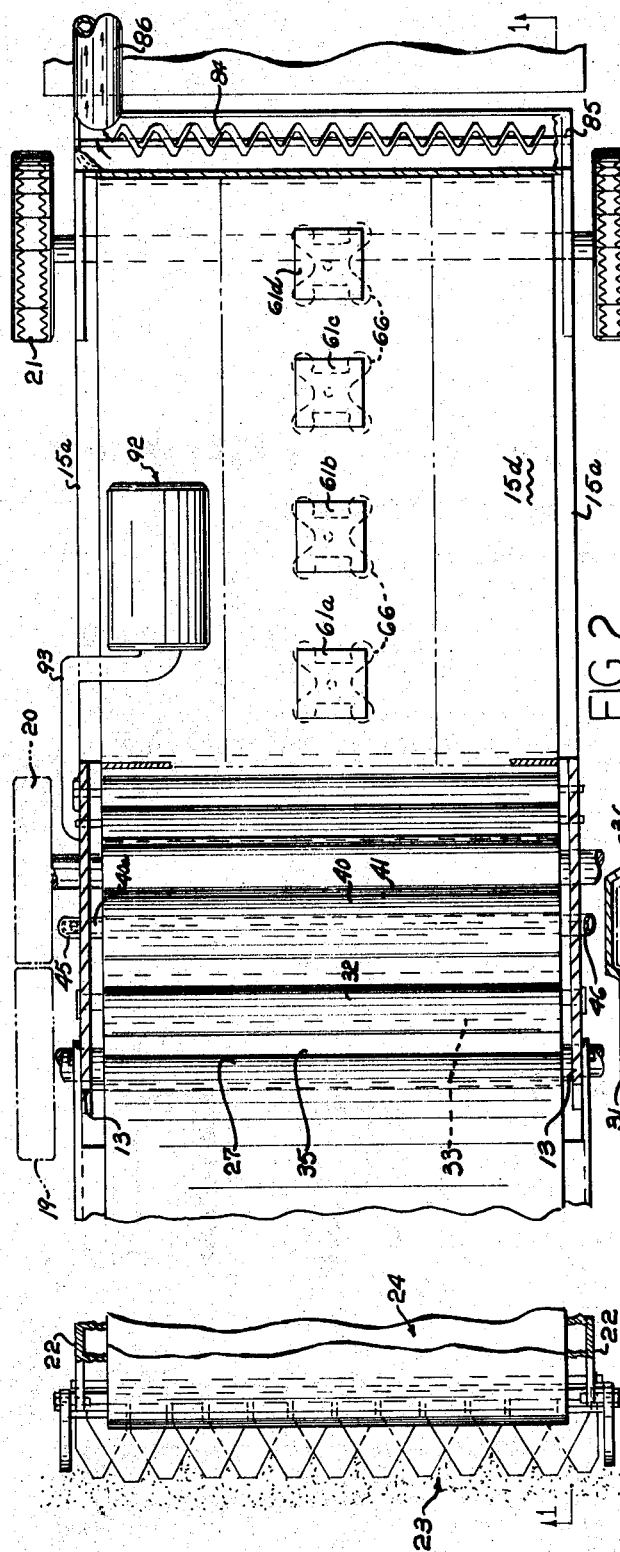
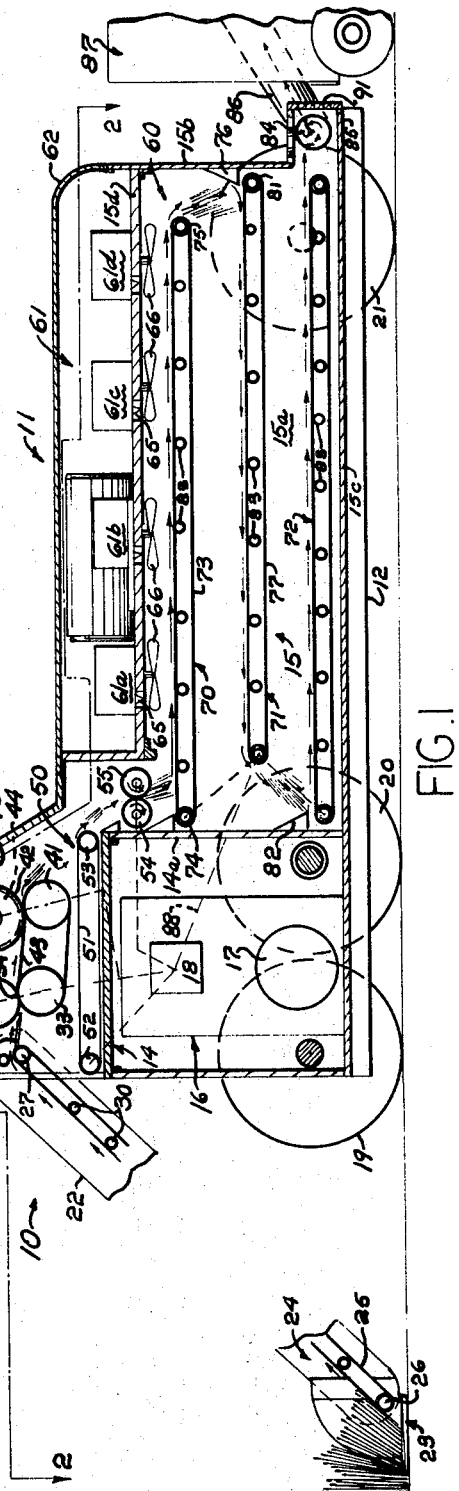
INVENTOR.
DAVID C. WINGER
BY
ATTORNEYS United States Patent Office 3,527,031
Patented Sept. 8, 1970

3,527,031
METHOD AND APPARATUS FOR HARVESTING FIELD CROPS
David C. Winger, R.D. 2, Mansfield, Ohio 44903
Filed Mar. 3, 1967, Ser. No. 620,431
Int. Cl. A01d 43/00
U.S. Cl. 56—1
8 Claims

ABSTRACT OF THE DISCLOSURE

An apparatus for harvesting a field crop comprises a wagon-like chassis having a frame supported by ground-engaging wheels, an internal combustion engine supported by the frame, a generator driven by the engine, a plurality of microwave generating units powered by the generator and connected to the chassis for directing microwave radiation into the chassis, conveyor means in the chassis for moving the crop past the microwave generating units to expose the crop to microwave radiation which dries the crop. Additionally, the apparatus includes a cutter bar for severing the field crop from the ground, a conveyor unit for conveying the crop from the cutter bar to crushing rolls which crush the stems of the crop, and heating means which removes external moisture from the crop prior to the crop being exposed to the microwave radiation.

---

The present invention relates to a method and apparatus for harvesting a field crop, and more particularly relates to the method and apparatus for harvesting hay and the like wherein the hay is cut from the ground, dried to a predetermined moisture content, and baled during a single harvesting operation.

Properly harvested and processed hay is known to have a great deal of feed value and, in fact, hay which is rated by the U.S. Agriculture Department as U.S. No. 1, has a feed value equivalent to that of corn. The advantages of producing U.S. No. 1 hay are apparent in that farm animals, such as cattle, may be fed such hay in conjunction with minimal amounts of grain and protein supplements. U.S. No. 1 hay, however, has been rather difficult to produce due to various problems encountered in curing the hay. Among the controlling factors in the production of such quality hay are the moisture content of the crop when it is taken from the field, and the length of time that cut hay remains in the field prior to baling.

Certain machines known as "direct windrowing machines" have been produced which mow, condition and rake the hay in one operation, after which the hay is baled. However, in many cases such machines have proven unsatisfactory since the green windrows will not dry. Hay must be properly dried before being baled or it will spoil in the hay mow and possibly cause fire due to spontaneous combustion. Moreover, freshly windrowed hay does not lose its moisture content for several days after being mowed and during this time, enzymes, oxidation, and weathering losses are generally such as to reduce its quality below that of No. 1 hay. Such machinery has therefore not proved entirely satisfactory for producing high-quality hay.

Generally speaking, hay is left in the field to dry in the sun before baling and sun curing, and if permitted for too long a duration, this sun curing causes losses in fat, sugar, minerals generally, and protein. Further, fermentation occurs if sun curing is permitted to go on as long as a day, and further losses of nutritional value of the hay result from such fermentation. Another problem involved with the sun curing method, or similar radiant heating of the hay, is that moisture in the individual plants is reduced to such a low level that embrittlement occurs and the leaves and small vines, which constitute the primary source of nourishment from the hay, are dropped from the stalks and lost.

A principal object of the present invention is the provision of new and improved method and apparatus for harvesting hay and the like wherein the hay is mowed, dried to a desired moisture content and baled in a single harvesting operation.

Another object of the present invention is the provision of a new and improved apparatus for harvesting hay and the like wherein the hay is cut and delivered to a wagon-like chassis in which the hay is exposed to microwave radiation for reducing the moisture content thereof uniformly throughout the individual plants after which the hay may be baled or otherwise prepared for storage.

Another object of the present invention is the provision of a new and improved harvesting apparatus of the type described including conveyor means having first and second conveyor units operable to convey the mowed hay past the source of microwave radiation in different directions and to effect controlled drying of the hay.

Other objects and advantages of the present invention will become apparent from the following detailed description of a preferred embodiment with reference to the accompanying drawings which form a part of the specification and wherein:

FIG. 1 is a sectional view of a more or less schematic form of a crop harvesting apparatus embodying the invention, taken approximately at line 1—1 of FIG. 2; and FIG. 2 is a sectional view of the apparatus of FIG. 1 taken approximately at the line 2—2 of FIG. 1.

Crop harvesting apparatus 10 embodying the invention is shown in FIG. 1, and which apparatus is moved over a field to cut, condition, and bale a field crop, such as hay. While the invention will be described herein in reference to taking in or harvesting hay, it will be apparent to those skilled in the art that other types of crops may be harvested utilizing this invention. The apparatus 10 includes a wagon-like chassis 11 including a main frame assembly 12, side frames 13 positioned at opposite sides of the frame 12 and which are spaced apart by a wall member generally designated 14. The chassis to the right of the wall member 14, as viewed in the drawings, forms a drying chamber 15 through which the hay which has been cut is conveyed and dried in a manner which is described in detail hereinafter. The chamber 15 is formed by a vertically extending forward wall 14a of the wall member 14, side walls 15a, and end wall 15b at the rear of the chamber, as viewed in the drawings, a wall member 15c closing the bottom of the chamber 15, and a cover 15d closing the top of the chamber. The frame 12 additionally supports an internal combustion engine 16 at its forward end and which internal combustion engine 16 drives an electric power generator 17 which produces electric power for a purpose described presently. The engine 16 is also drivingly connected to various conveyors for handling the hay by a suitably constructed transmission 18, shown schematically in FIG. 1.

The chassis 11 is supported by three pairs of ground-engaging wheels, 19, 20, 21, one wheel of each of the pairs being illustrated in FIG. 1, and the engine 16 in the preferred embodiment is drivingly connected to the pairs 19, 20 of ground-engaging wheels for propelling the vehicle. The drive transmission between the engine and the drive wheels may be of any suitable construction, and therefore has not been illustrated.

The side frames 13 at the forward end of the chassis 11, as viewed in the drawings, support channel-like frame members 22, which extend downwardly from the side frames toward the ground in advance of the chassis 11.

The frame members 22 support a cutter bar generally designated at 23 which is driven from the engine 16 and is effective to sever the crop from the ground. The cutter bar 23 may be raised and lowered relative to the ground by pivotal adjustment of the frame members 22 about a pivot axis through the side frames 13. Any suitable well known crop cutting mechanism could be employed.

The frame members 22 support a conveyor unit 24 which receives the hay from the cutter bar 23 and conveys the cut hay toward the chassis 11. The conveyor unit 24 includes an endless belt 25, the width of which forms a substantial proportion of the width of the cutter bar 23, and which is trained around rotatable shafts or pulleys 26, 27 located at opposite ends of the frame members 22 journaled in the frames for rotation with respect thereto. The upper run or reach of the belt 25 is suitably supported by idler shafts, generally designated 30, which are journaled in the frame members 22. The conveyor unit 24 is driven from the engine 16 by a suitable driving connection to move the cut hay from the cutter bar 23 to a crushing means 31 located in the chassis 11 between the side frames 13.

The crushing means 31 includes a pair of rotatable cylinders or rollers 32, 33 which are journaled in the side frames 13 and are rotatable in a tangential relation to form a crushing nip 34 therebetween. The individual plants of the hay are carried endwise along the conveyor 24 and are guided into the crushing nip 34 by a suitably constructed guide member 35 extending between the upper end of the conveyor unit 24 and the crushing nip 34. The cylinders 32, 33 are driven from the engine 16, and in the preferred embodiment, the surface speeds of these cylinders are the same.

The peripheries of the cylinders 32, 33 include longitudinally extending narrow ridges (not illustrated), which tend to mesh at the nip 34 and crimp the individual plants transversely of their stems. The hay is crushed in the nip 34, as described, to break the stalks and stems of the plants for a purpose which is apparent hereinafter.

The crop is delivered from the crushing means 31 to heating means 36 which is effective to evaporate external moisture, such as dew, from the hay as well as to crush the hay. In the illustrated embodiment the heating means comprises rotatable cylinders 40, 41, which are journaled in the side frames 13 and rotate in a tangential relation to form a nip 42 therebetween. A suitably constructed guide 43 is provided for directing the hay from the crushing nip 34 to the nip 42, and in the illustrated embodiment the guide 43 is in the form of an endless belt.

The cylinder 40 is heated and as the periphery of that cylinder engages the hay at the nip 42, heat is transferred from the cylinder 40 to the hay to evaporate the aforementioned external moisture. The cylinder 40 is preferably formed of a high strength material having a relatively high heat conductivity, such as steel, and has a cylindrical chamber 44 formed therein and which is of such diametrical extent that the peripheral wall of the cylinder 40 is relatively thin. The exhaust gases from the engine 16 are directed through the chamber 44 to effect heating of the peripheral wall of the cylinder to effect the aforementioned evaporation of the external moisture on the plants. The cylinders 40, 41 are in pressure engagement with the crop at the nip 42 and crush the plants longitudinally as they pass through the nip.

The engine exhaust gases which heat the cylinder 40 flow to the cylinder through a pipe 45 (see FIG. 2), and are directed into the chamber 44 through a central bore in a supporting shaft 40a for the cylinder 40. The gases are circulated through the chamber 44 and exit from the cylinder through a bore in the support shaft 40b for the cylinder at the opposite end of the cylinder. A suitable exhaust stack 46 may be connected to the supporting shaft 40b for the cylinder 40, and the pipe 45 and stack 46 are coupled to the shafts 40a, 40b by suitable bearing couplings permitting relative rotation between the shafts 40a, 40b, and the pipes 45, 46.

The hay which has been heated and dried at the nip 42 is dropped onto a conveyor unit 50, including an endless belt 51 which is trained around rotatable shafts or pulleys 52, 53 which are journaled in the side frames 13 and side wall members 15a, respectively. The conveyor unit 50 is located beneath the crushing and heating means 31, 36 respectively, and conveys the hay which has passed through the heating means 36 toward the chamber 15. The conveyor unit 50 extends from the end of the conveyor 24 beneath the heating and crushing means so that any hay which may be dropped during the crushing and heating operations is received by the conveyor unit 50.

Hay coming off the conveyor unit 50 is passed between hard rubber rollers, 54, 55 and dropped onto the conveyor means generally designated 60 in the chamber 15. The rollers 54, 55 are in pressure engagement and compact the hay passing therebetween, since the hay leaving the nip 42 of the heating means 36 is in a condition which may be described as "fluffed."

In accordance with the present invention the crop is conveyed through the chamber 15 and exposed to microwave radiation while being thus conveyed. As illustrated in the drawings, the chassis 11 includes microwave generating means 61, positioned to generate microwave radiation which is directed into the chamber 15. the microwave generating means 61 includes four microwave generator units 61a, 61b, 61c, 61d, which are powered from the generator 17 and supported between the side wall members 15a of the chassis 11 by the cover members 15d, and protected from the weather by a closure member 62. Each of the microwave generating units includes a magnetron or klystron tube which emits microwave radiation when energized from the generator 17. Energization of the microwave generating units is effected by suitable control switches in the circuitry between the generator 17 and the units, and power regulating means may also be provided in this circuitry where desired. The switches and power regulating means are not shown as they are of well known form.

Each of the units 61a, 61b, 61c, 61d includes a waveguide, schematically illustrated at 65, and is provided with a propeller-like reflector 66 which is suitably driven from the engine 16, with each reflector being rotated to distribute the microwave radiation from its respective waveguide and to disburse such waves through the chamber 15. The reflectors 66 are preferably composed of a light metallic material which does not absorb the radiation.

It has been found that the generation of microwaves, and more specifically, electromagnetic waves having a frequency in the range of $2.45 \times 10^9$ cycles per second, is critical in the drying process of the hay. These waves have the effect of drying the hay substantially uniformly throughout the individual plants so that internal moisture in the plants is not retained. This drying process is to be distinguished from radiant heating utilizing, for example, infra-red rays which do not penetrate the hay and do not effect internal evaporation of the moisture in the hay, but rather dry the external areas of the crop first forming a crust which causes moisture to be trapped internally in the individual plants. The internal moisture which is evaporated by the microwaves is exhausted through openings in the stalks and stems which are formed as a result of crushing the hay as described so that the number of split or exploded stems, kernels, seeds of the crop, which might otherwise result from evaporation of trapped moisture, is reduced.

In the preferred embodiment the conveyor means 60 includes three conveying units generally designated 70, 71, 72. The conveyor unit 70 includes an endless belt 73 trained around rotatable shafts 74, 75 which are journaled in the side walls 15a of the chassis 11, and which endless belt receives the hay which has passed between the rollers 54, 55 and conveys the crop toward the rear of the chassis 11, as illustrated in the drawing. The shaft 75 is spaced from the end wall 15b of the chamber 15 so that as the belt 73 follows around the periphery of the shaft 75, the crop carried thereon is dropped from the belt 73 onto the conveyor unit 71. The crop which is dropped from the belt 73 is guided onto the conveyor unit 71 by a suitably constructed guide member 76.

The conveyor unit 71 includes an endless belt 77 which is trained around shafts 80, 81 which are journaled in the side walls 15a, as described above with reference to the unit 73. The crop is conveyed by the unit 71 toward the front wall of 14a of the chamber 15, and as the belt 77 is trained around the shaft 80, the crop is dropped from the conveyor 71 and is guided onto the conveyor 72 by a guide 82. The conveyor 72 is of substantially the same construction as the conveyors 70, 71 described above. In the preferred embodiment, each of the belts of the conveyor units 70–72 has its upper run supported by idler shafts 83 journaled in the side walls 15a.

The dried hay is dropped from the conveyor unit 72 and engaged by an auger 84 which is journaled between rearwardly extending flanges 85 of the side walls 15a and driven from the engine 16. The auger 84 conveys the crop transversely of the apparatus to a suitable conveyor 86 which removes the crop from the chamber and to a trailing vehicle 87 which preferably includes bailing or other suitable compacting machinery. The auger 84 is enclosed by a sheet-metal housing 90 having a plurality of openings 91, forming wave guides which cause the microwaves impinging on the housing 90 to be partially reflected and lose their properties as microwaves.

The conveyor units 70–72 are driven from the transmission 18 by a suitable drive train 88, shown schematically, which permits variable speed operation of the conveyors to control the length of time during which the crop is exposed to the microwave radiation and therefore the moisture content of the crop delivered from the chamber 15. While other constructions can be provided, the drive train 88 preferably includes a belt drive having variable radius pulleys to effect desired changes in feeding speed of the material through the chamber 15.

The endless belts utilized in the conveyor units 70, 71, 72 are constructed of a dielectric material which transmits the microwave radiation, and is therefore not heated when exposed to the microwave radiation. Furthermore, the shafts and supports for the belts are composed of a fiber glass material which also transmits microwaves rather than being heated thereby. Additionally, the walls of the chamber 15 are constructed of reflective metallic materials which also remain unheated by the microwaves. As a result of this construction, the organic material in the chamber 15, that is, the hay, is heated by the microwave radiation while the component parts of the conveyor means 60 and chassis 11 surrounding the chamber 15 are, for the most part, unheated. The transmission and reflection of the microwaves by the aforementioned parts of the chassis 11 increases the effectiveness of the microwaves in drying the crop while minimizing the temperature of the parts of the chassis 11 which bound the chamber.

The supporting shafts for the belts of the conveyor units 70–72 are preferably hollow and their fiber glass construction is such that the walls of the shafts are porous. As best seen in FIG. 2, a fan means 92 is supported above the conveyor units which is associated with ducting 93 for delivery of a forced flow of air from the fan means to the hollow interior of the belt supporting shafts. The forced flow of fresh air is thus directed into the chamber 15 and is exhausted from the chamber primarily through the openings in the housing 90 for the auger 84, and which flow of air carries the evaporated moisture away from the hay. While the ducting 93 has been illustrated as extending only to the driving shafts of the conveyors 70–72, it is to be understood that the ducting could be associated with other shafts of the conveyors.

It can now be seen that a new and improved method and apparatus for harvesting a field crop has been provided wherein crops such as hay can be severed from the ground, properly cured, and baled in a single harvesting operation, and that there has been provided a new improved method and apparatus for curing the harvested field crop, such as hay, by the use of microwave radiation to provide for uniform drying of the individual plants of the crop to a controlled moisture level to insure a relatively high quality feed value.

While a single embodiment of the present invention has been described and illustrated herein in considerable detail, it should be apparent that other constructions, embodying the present invention could be devised. The present invention is not to be considered to be limited to the precise construction shown, but rather it is my intention to cover hereby all adaptations, modifications, and uses of the present invention which come within the scope of the appended claims.

I claim:

1. A method of harvesting a field crop and preparing the crop of storage by reducing the moisture content thereof comprising the steps of severing the crop, and substantially immediately exposing said crop to microwave radiation for a period to substantially reduce the moisture content of the crop.

2. A method as defined in claim 1 and further including the step of controlling the length of time said crop is exposed to said microwave radiation to control the moisture content of said crop.

3. Apparatus for harvesting a field crop comprising a wagon-like chassis having a frame supported by ground-engaging wheels, an internal combustion engine supported by said frame, an electric power generator driven by said engine, microwave generating means powered by said generator including at least one microwave generating unit connected to said chassis for directing microwave radiation thereinto, and conveyor means in said chassis including a first conveyor unit for moving said crop in a first direction past said microwave generating unit to expose said crop to said microwave radiation and a second conveyor unit for receiving the crop from said first conveyor unit and moving said crop past said microwave generating unit in a second direction.

4. Apparatus as defined in claim 3 and further including means for crushing said crop to break stems thereof to permit internal moisture to escape from said crop when exposed to said microwave radiation.

5. Apparatus as defined in claim 3 and further including heating means for evaporating external moisture from said crop including a heated member engageable with said crop to evaporate said external moisture, said evaporating means being located in advance of said conveyor means.

6. Apparatus as defined in claim 5 wherein said evaporating means includes first and second rotatable nip forming cylinders driven from said engine and operable to engage said crop as said crop moves through said nip, and means for directing exhaust gases through one of said cylinders to heat a crop engaging periphery thereof.

7. Apparatus as defined in claim 3 wherein said conveyor means includes endless belt members for supporting and transporting said crop past said microwave generating unit, said belt members being constructed of a flexible dielectric material operative to transmit said microwave radiation and resistant to heating by said microwave radiation.

8. Apparatus as defined in claim 3 wherein said microwave radiation has a frequency in the range of $2.45 \times 10^9$ cycles per second.

References Cited

UNITED STATES PATENTS

| | | | |
|---|---|---|---|
| 3,409,023 | 11/1968 | De La Burdé | 131—121 |
| 1,255,982 | 2/1918 | Byers | 56—10 |
| 2,756,554 | 7/1956 | Diehl et al. | 56—1 |
| 2,806,337 | 9/1957 | Rezabek | 56—1 |
| 3,257,785 | 6/1966 | Rimes | 56—10 |

ANTONIO F. GUIDA, Primary Examiner

U.S. Cl. X.R.

56—10, 23